United States Patent [19]

Shimada et al.

[11] Patent Number: 5,408,309
[45] Date of Patent: Apr. 18, 1995

[54] APPARATUS AND METHOD FOR INSPECTING ELLIPLICITY AND ECCENTRICITY OF OPTICAL FIBER PREFORMS

[75] Inventors: Tadakatsu Shimada; Kazuo Koya, both of Gunma, Japan

[73] Assignee: Shin-Etsu Chemical Co., Ltd., Tokyo, Japan

[21] Appl. No.: 111,664

[22] Filed: Aug. 25, 1993

[30] Foreign Application Priority Data

Aug. 27, 1992 [JP] Japan .................... 4-228737

[51] Int. Cl.$^6$ .................... G01B 11/24; G01N 21/84
[52] U.S. Cl. .................... 356/73.1; 356/426
[58] Field of Search .................... 356/73.1, 426, 237, 356/239

[56] References Cited

U.S. PATENT DOCUMENTS

| | | | |
|---|---|---|---|
| 4,168,907 | 9/1979 | Presby | 356/239 X |
| 5,078,488 | 1/1992 | Yamaguchi et al. | 356/73.1 |
| 5,118,954 | 6/1992 | Grosso | 356/73.1 |

*Primary Examiner*—Vincent P. McGraw
*Attorney, Agent, or Firm*—McAulay Fisher Nissen Goldberg & Kiel

[57] ABSTRACT

The inspection apparatus for determination of the degree of ellipticity of an optical fiber perform and the eccentricity of the core thereof comprises optical system 12 for projecting a light beam from light source 10 through optical fiber preform 1 to video camera 11; and signal processing circuit 17 for converting the image of the optical fiber preform 1 photographed by the video camera 11 into a numerical value and the apparatus is connected to driving device 14 for rotating the optical fiber preform 1 traversing the optical path of the optical system 12 around the central axis of the preform 1. The curve showing the external shape of the optical fiber preform 1 is represented by the formula: $v=(a-b)\sin 2\theta$ and the line showing the external shape of the core represented by the formula: $w=nU\sin 2\theta+(n-1)(a-b)\sin(2\theta+\alpha)$. The eccentricity of the core can be calculated from these values.

10 Claims, 7 Drawing Sheets

APPARATUS AND METHOD FOR INSPECTING ELLIPLICITY AND ECCENTRICITY OF OPTICAL FIBER PREFORMS

BACKGROUND OF THE INVENTION

The present invention relates to an apparatus for inspecting the eccentricity of the core of an optical fiber preform and the ellipticity of the external shape of the optical fiber preform and a method for inspecting an optical fiber preform making use of the inspection apparatus.

An optical fiber comprises a core portion and a clad layer and permits the propagation of light rays along the core portion. For this reason, if two optical fibers are connected to one another, the cores of these two optical fibers should be precisely aligned. If the external shapes of two optical fibers coincide with one another, but either or both of the cores have eccentricity, the connection loss increases due to the discrepancy between the positions of these cores. For this reason, the preform as a starting material to be drawn into an optical fiber should comprise a core portion free of any eccentricity in the production of an optical fiber and the management thereof, it is very important to inspect an optical fiber preform as a starting material and to thus select an optical fiber preform comprising a core portion having low eccentricity from the foregoing standpoint.

Japanese Patent Application Publication No. 3-09060 discloses a method for determining eccentricity of an optical fiber which comprises observing the core of an optical fiber from two lateral directions perpendicular to one another to determine the coordinate of the off-centered core and correcting the coordinate for the magnification due to the curved side face of the optical fiber which serves as a lense and makes light rays refract to thus determine the degree of practical eccentricity of the core.

The inventors of the present invention practically determined the eccentricity of the core of an optical fiber preform according to the method disclosed in this patent. As a result, the degree of eccentricity of the core can precisely be determined if the optical fiber preform has an external shape which is an approximately true circle. However, if the external shape thereof is distorted, the eccentricity of the core cannot precisely be determined. Most of the distorted external shapes of optical fiber preforms are elliptic ones and this makes the determination of the eccentricity inaccurate. More specifically, if the core of an optical fiber preform having an elliptic external shape is observed from two lateral directions perpendicular to one another, the optical path length extending from the side face of the optical fiber preform to the core (optical path length corrected for the deviation due to the refractive index of the optical fiber preform) varies depending on the directions of observation, or the magnification of the curved surface of the preform which serves as a lense varies depending on the directions of observation. This accordingly leads to the inaccurate determination of the eccentricity of the core. According to the method disclosed in the foregoing patent, any accurate eccentricity cannot be obtained through the observation of an optical fiber preform from only two lateral directions.

Incidentally, if the core of an optical fiber preform is observed while immersing the preform in a matching oil as disclosed in Japanese Patent Application Publication Nos. 56-37493 and 57-21644, there can be ensured the elimination of any influence of the curved surface (i.e., side face) of the optical fiber preform as a lense (hereinafter referred to as "lense action of the curved surface") on the determination of the eccentricity of the core. This makes, needless, the requirement for any correction of the measured value for the magnification due to the lense action of the curved surface and, therefore, it is not necessary to take any change in curvature of the elliptic lateral surface of the preform into consideration. However, this method requires the use of a complicated apparatus since an optical fiber preform to be inspected must be immersed in a matching oil in this method and the method requires much labor to completely remove the matching oil adhered to the preform through washing after completion of the determination.

SUMMARY OF THE INVENTION

The present invention has been developed for the solution of the foregoing problems associated with the conventional techniques and it is an object of the present invention to provide an apparatus for inspecting an optical fiber preform which permits accurate determination of the degree of ellipticity of an optical fiber preform and the eccentricity of the core of the preform through observation of the preform while rotating it without immersing it in a liquid such as a matching oil even when the preform has an elliptic external shape as well as a method for the inspection of an optical fiber preform for eccentricity and ellipticity.

The inventors of this invention have found out that, if an optical fiber preform to be inspected has an elliptic external shape, the optical path length thereof varies depending on the directions of observation and have inquired into the following phenomenon.

The phenomenon, on which the present invention is based, will be detailed with reference to the attached FIGS. 4 to 7. In those Figures, the reference numeral 1 represents an optical fiber preform, 2 represents a core and 3 represents a clad layer. When optical fiber preform 1 rotates around its central axis, an observed upper side of optical fiber preform 1 is represented by $v_1$, an observed bottom side thereof is represented by $v_2$, and an observed upper side of core 2 is represented by $u_1$, an observed bottom side thereof is represented by $u_2$. Length "w" of eccentricity degree between the central axis of the optical fiber preform 1 and the central axis of the core 2 is represented by the following formula:

$$w = (u_1 + u_2)/2 - (v_1 + v_2)/2 \quad (I)$$

Figure 4:
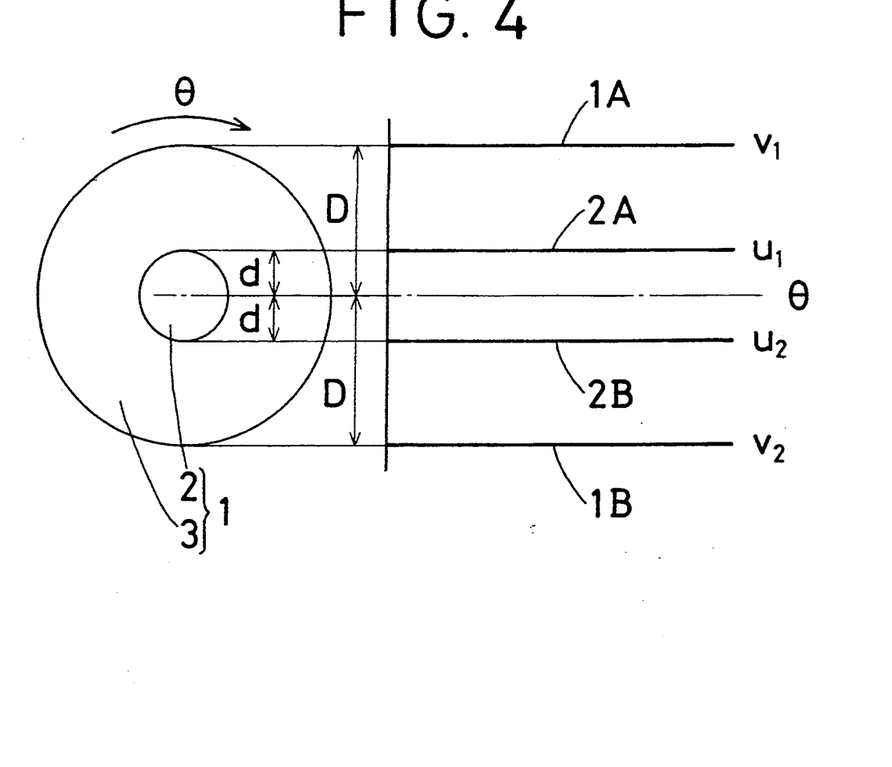
FIG. 4 is a diagram for explaining the principle of the inspection method according to the present invention.

As shown in FIG. 4, if core 2 is free of any eccentricity and optical fiber preform 1 has an external shape of a true circle and if the core 2, which has a radius of d, and the optical fiber preform 1, which has a radius of D, are represented by continuous lines respectively with the angle of rotation $\theta$ as abscissa, both lines 2A and 2B showing the external shape of the core 2 and line 1A and 1B showing the external shape of the optical fiber preform 1 give approximately straight lines. If an object positioned in the proximity of the center of a sphere having a refractive index of n is observed from the outside of the sphere, the object is magnified by a factor of n. Accordingly, if the core 2 positioned in a proximity of a center of clad layer 3, i.e. a cylinder having a refractive index of n, is observed from the outside of the optical fiber preform 1, the core 2 is magnified $n \times d$ times. In case of FIG. 4, $u_1$ observed an external shape of core 2 is equal to "nd", $u_2$ observed the other external shape of the core 2 is equal to "$-nd$", $v_1$ observed an external shape of optical fiber preform 1 is equal to "D" and $v_2$ observed the other external shape of the optical fiber preform 1 is equal to "$-D$". Substituting these $u_1$, $u_2$, $v_1$ and $v_2$ into the above formula (I), eccentricity "w" makes 0.

Figure 5:
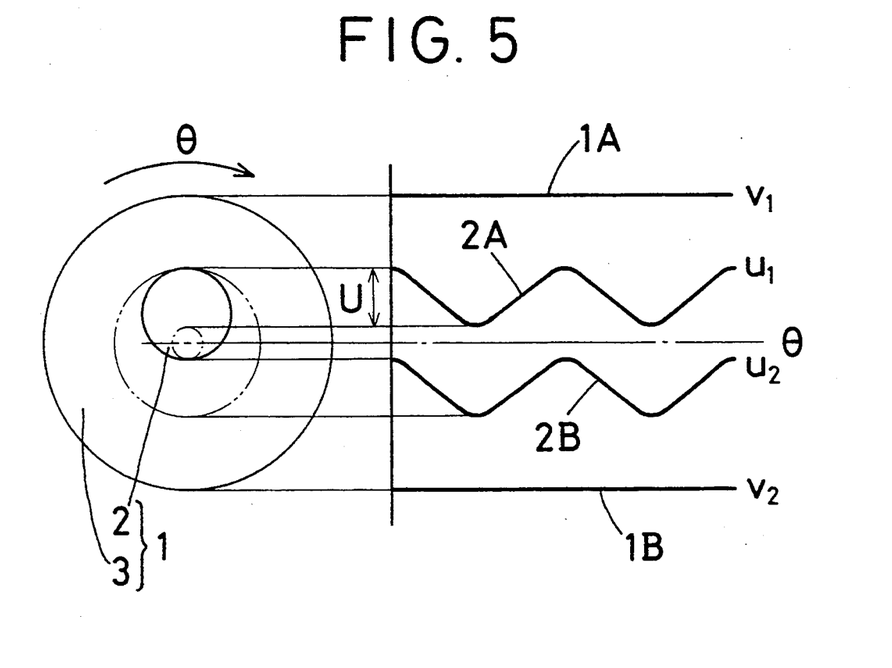
FIG. 5 is a diagram for explaining the principle of the inspection method according to the present invention.

As shown in FIG. 5, if core 2 is not concentric with optical fiber preform 1 and if optical fiber preform 1 an external shape of a true circle, the core 2 fluctuates with a period by one cycle rotation of the optical fiber preform 1. For this reason, continuous line 2A showing the external shape of the core 2 makes a sine curve "U Sin$\theta$" of which an amplitude is represented by U and a period is $2\pi$ radian cycle. The continuous line 2A can be observed from the side of optical fiber preform 1 while taking into consideration the magnification action of the clad layer 3 having a refractive index n. Thus, $u_1 = nU\sin\theta + nd$, $u_2 = nU\sin\theta + nd$. On the other hand, line 1A showing the external shape of the optical fiber preform 1 gives a straight line and, thus, $v_1 = D$, $v_2 = -D$. Substituting these $u_1$, $u_2$, $v_1$ and $v_2$ into the above formula (I), "w" of eccentricity degree is given as follow:

$$w_1 = n\ U \sin\theta \quad (II)$$

In case of FIG. 5, eccentricity degree between the central axis of the optical fiber preform 1 and the central axis of the core 2 is observed as the above formula (II) and a practical value thereof can be determined by dividing an observed amplitude of "nU" by "n" of refractive index thereof.

Figure 6:
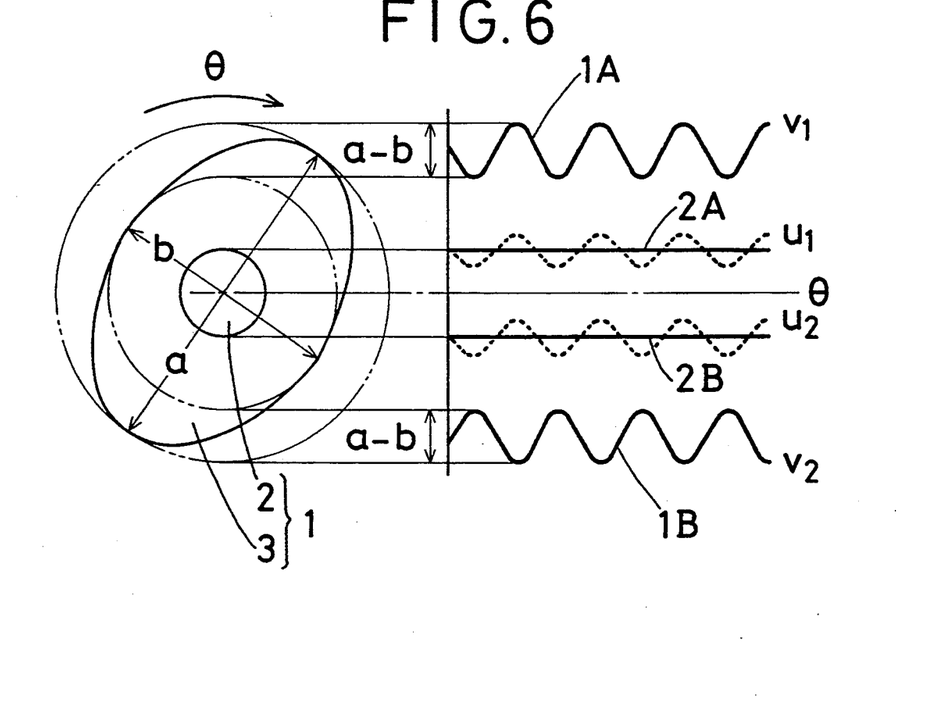
FIG. 6 is a diagram for explaining the principle of the inspection method according to the present invention.

As shown in FIG. 6, if core 2 is free of any eccentricity and optical fiber preform 1 has an elliptic external shape having a major radius of "a" and a minor radius of "b", line 1A showing an external shape of an optical fiber preform 1 fluctuates with a period by a half cycle rotation of the fiber preform 1. Continuous line 1A gives a sine curve having an amplitude of (a−b) and a period of $\pi$ radian represented by the following formula:

$$v_1 = (a-b)\sin 2\theta + D \quad (III)\text{-}1$$

$$v_2 = -(a-b)\sin 2\theta - D \quad (III)\text{-}2$$

The sine curve of Formula (III)-1 and (III)-2 can be directly observed through the side of the optical fiber preform 1.

Since core 2 is free of any eccentricity, the line 2A showing the external shape thereof can be denoted by a continuous straight line but, as shown by a dotted line, the line 2A can be observed through the side of the optical fiber preform 1 under influence of magnification action of elliptic clad layer 3 having a refractive index of n. Therefore, the observed image of the straight line 2A can be represented by the following formula (III):

$$u_1 = (n-1)(a-b)\sin 2\theta + nd \quad (IV)\text{-}1$$

$$u_2 = (n-1)(a-b)\sin 2\theta - nd \quad (IV)\text{-}2$$

A magnification is high while an optical path is in line with a major radius of the ellipse but the magnification is low while an optical path is in line with a minor radius thereof since the longer the optical path length, the higher the magnification. For this reason, there is no deviation in phases between sine curve $v_1$ by Formula (III)-1 and sine curve u, by Formula (IV)-1 but there is a deviation in phases by a half period between sine curve $v_2$ by Formula (III)-2 and sine curve $u_2$ by Formula (IV)-2. Substituting $u_1$ represented by Formula (IV)-1, $u_2$ represented by Formula (IV)-2, $v_1$ represented by Formula (III)-1 and $v_2$ represented by Formula (III)-2 into the above formula (I), "w" of eccentricity degree is given as follow:

$$w_z = (n-1)(a-b)\sin 2\theta \quad (V)$$

Then, the elliptic degree, i.e. a−b, of the optical fiber preform 1 can be calculated from the elliptic from the amplitude of (n−1)(a−b) of the formula (V).

Figure 7:
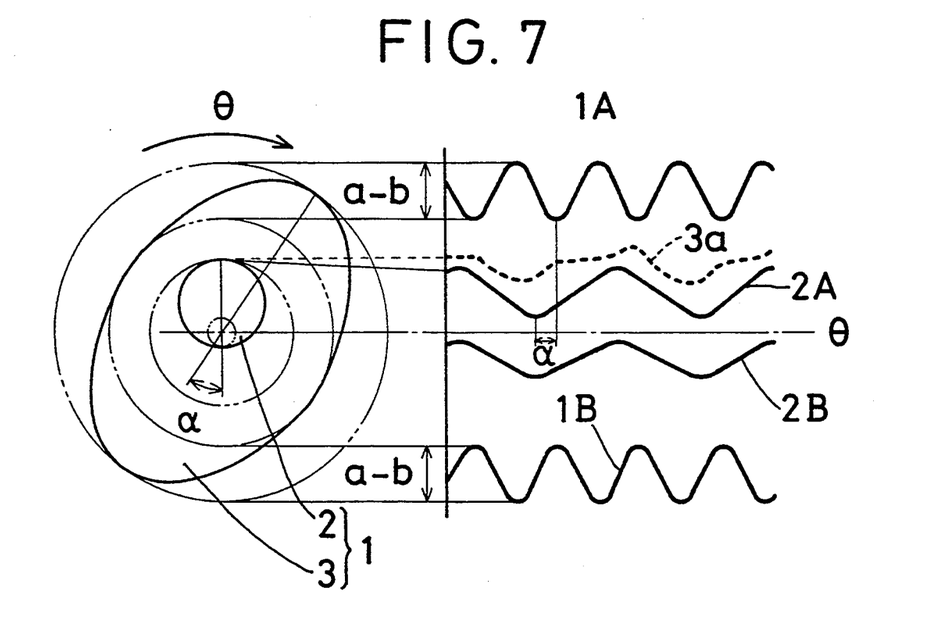
FIG. 7 is a diagram for explaining the principle of the inspection method according to the present invention.

Further, FIG. 7 shows the core 2 and the clad layer 3 are not concentric and the optical fiber preform 1 has an elliptic external shape having a major radius of "a" and a minor radius of "b". Line 2A showing the external shape of the core 2 can be represented by a sine curve having an amplitude of U and a period of $2\pi$ radian, USin$\theta$, by rotation of the optical fiber preform 1, while line 1A showing the external shape of the optical fiber preform 1 fluctuates with a period of $\frac{1}{2}$ cycle and is represented by a sine curve, (a−b)Sin$2\theta$ having an amplitude of a−b and a period of $\pi$ radian. The line 3a showing the external shape of the core 2 can be observed from the side of the optical fiber preform 1 as represented by the following formula (VI) which is obtained by substituting w, of the above formula (II) and $w_2$ of the above formula (V) into the above formula (I):

$$w = nU\sin\theta + (n-1)(a-b)\sin(2\theta + \alpha) \quad (VI)$$

In formula (VI), $\alpha$ is an angle of a phase difference between the eccentric direction of the core and the elliptic direction of the the optical fiber preform.

On the basis of the foregoing relations, it has been found out that the degree of eccentricity of the core and the degree of ellipticity of the optical fiber preform 1 can accurately be inspected by observing the preform 1 while rotating the preform 1.

Figure 1:
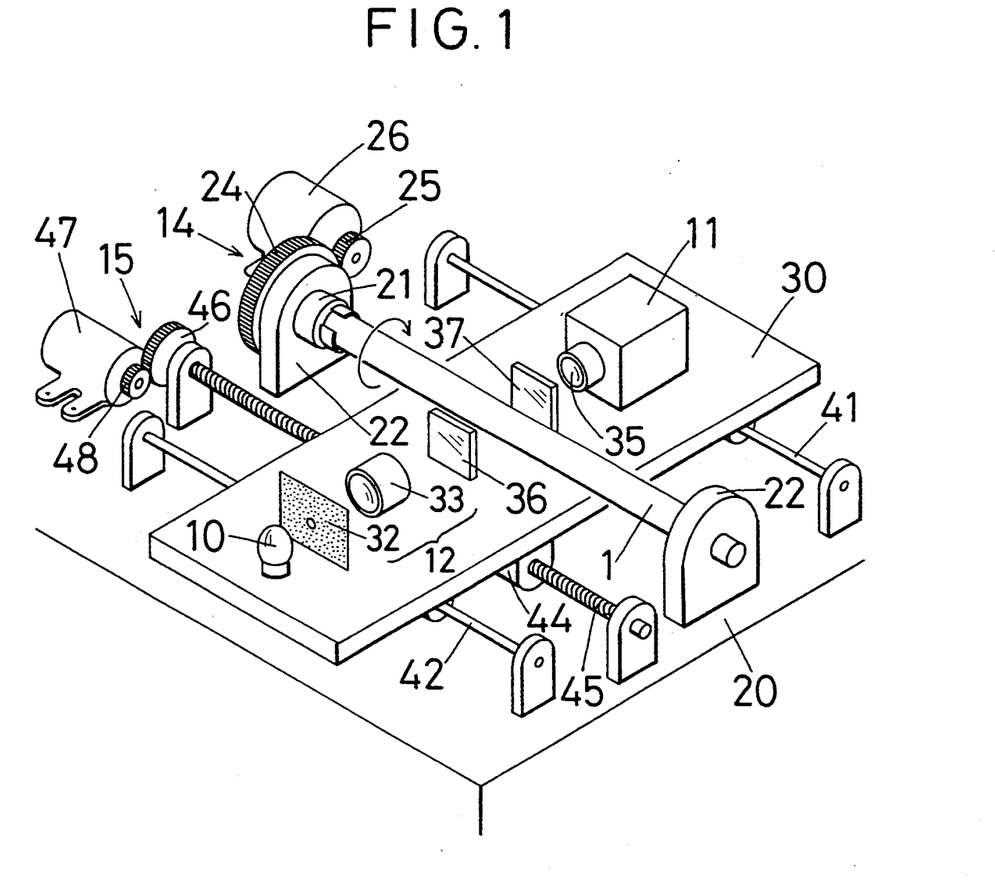
FIG. 1 is a perspective view showing an embodiment of the apparatus for inspecting an optical fiber preform according to the present invention.

The present invention was invented on the basis of this finding. The apparatus of the invention for inspecting approximately round rod-like optical fiber preform 1, which consists of core 2 and clad layer 3, is shown in FIG. 1 corresponding to an embodiment of the present invention. The present apparatus comprises optical system 12 which lies in the region between light source 10 and video camera 11 and which projects a light beam from the light source 10 on optical fiber preform 1 traversing the optical path of the beam and signal processing circuit 17 which converts images of the optical fiber preform 1 photographed by the video camera 11 into a continuous curve and the apparatus is connected to driving device 14 for rotating the optical fiber preform 1 traversing the optical path of the optical system 12 around the central axis of the preform 1.

The inspection apparatus is preferably provided with device 15 for scanning the optical path of the optical system 12, or a light beam, along the longitudinal direction of the approximately round rod-like optical fiber preform 1.

According to the inspection apparatus of the present invention, the approximately round rod-like optical fiber preform 1 is rotated by the driving device 14, while the optical fiber preform 1 is irradiated with a light beam emitted from the light source 10 incident upon the preform from the side face, the light beam transmits through the preform to give a projected images thereof which are periodically photographed by the video camera 11 at points of $\theta$ radians of rotating angles through $2\pi$ radian rotating of the optical fiber preform 1. Differences between central coordinates of the rotating core 2 and central coordinates of the rotating preform 1 obtained from the photographed images are converted into a continuous curve by the action of the signal processing circuit 17. The optical fiber preform 1 can be inspected for the degree of ellipticity of the preform 1 and the degree of the eccentricity of the core 2 the continuous curve.

The continuous curve is a composite curve of a sine curve having a period of $\pi$ cycle and a sine curve having a period of $2\pi$ cycle as follow:

$$w = nU \sin\theta + (n-1)(a-b)\sin(2\theta+\alpha) \qquad (VI)$$

The continuous curve is separated sine curves by $\pi$ radian cycle and $2\pi$ radian cycle and then the true eccentric degree U of the core 2 can be determined from the amplitude nU of the sine curve by the $2\pi$ radian cycle and, also, the true elliptic degree of the optical fiber preform 1 can be determined from the amplitude $(n-1)(a-b)$ of the sine curve by the $\pi$ radian cycle.

When the apparatus for inspecting an optical fiber preform according to the present invention is equipped with device 15 for scanning the optical fiber preform 1 with a light beam, the apparatus allows the inspection of the entire preform along the longitudinal direction thereof and accordingly, the inspection of the degree of ellipticity of the preform 1 and the degree of eccentricity of the core which may be changed in the middle of the preform 1.

As has been explained above in detail, the apparatus and method for inspecting an optical fiber preform permit correct determination of the degree of ellipticity of the preform and the degree of eccentricity of the core thereof through the observation of the optical fiber preform while rotating the preform. Moreover, the optical fiber preform is not immersed in a matching liquid even when the preform is in the form of an ellipse and this makes the structure of the apparatus simple and results in the elimination of any washing operation for the removal of a matching oil from the preform.

DETAILED EXPLANATION OF THE INVENTION

The most preferable embodiment, but not limited, of the present invention will hereinafter be described in more detail with reference to the accompanying drawings.

FIG. 1 is a perspective view showing an embodiment of the apparatus for inspecting optical fiber preform 1 according to the present invention. In the apparatus shown in FIG. 1, a light beam from light source 10 is incident upon optical fiber preform 1 through optical system 12 to form images of core 2 and clad layer 3 of the preform 1, the images are photographed by video camera 11 and the resulting image signals are inputted to signal processing circuit 17 (see FIG. 2). The optical fiber preform 1 is connected to rotating-driving device 14.

In the rotating-driving device 14, the front and rear edges of optical fiber preform 1 are nipped in chucks 21, only one of them are shown in FIG. 1 and, thus, preform 1 is supported by fixing table 20 through holder 22 which rotatably holds these chucks 21. Gear 24 connected to one of the chucks 21 and gear 25 of pulse motor 26 engage with each other.

The light source 10, the optical system 12 and the video camera 11 are arranged on scanning table 30. The light source 10 herein used is, for instance, a tungsten lamp. The light source 10 is designed in such a manner that the optical fiber preform 1 is irradiated with light beam through the optical system 12 which comprises aperture light-shielding plate 32 and condenser lense 33 and through polarizing plate 36. Video camera 11 is equipped with image pick-up lense 35 and a CCD photoelectric transfer element and arranged at the position opposite to the optical system 12 while the image pick-up lense 35 faces the optical fiber preform 1. The polarzing plate 37 is positioned in the region between the image pick-up lense 35 and the optical fiber preform 1.

The scanning table 30 is connected to a scanning-driving device 15 and mounted on the fixing table 20. More specifically, in the scanning table 30, threaded rod 45 fitted to the upper face of the fixing table 20 is screwed in ball nut 44 fitted to the back face of the scanning table and gear 46 connected to the threaded rod 45 engages with gear 48 of motor 47. Guide rods 41 and 42 which are mounted on and fixed to the fixing table 20 support the scanning table 30 in a freely slidable manner.

Figure 2:
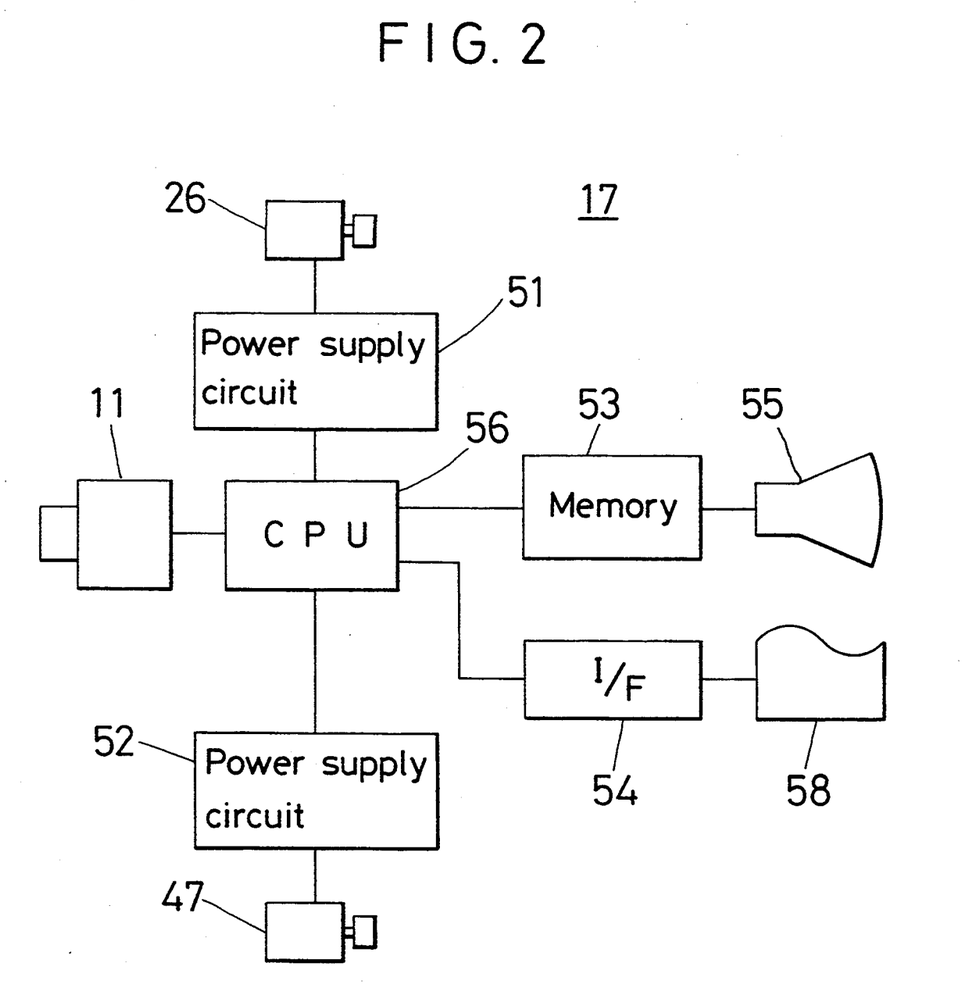
FIG. 2 is a block diagram showing an embodiment of a signal processing circuit to be incorporated into the inspection apparatus according to the present invention.

Video camera 11 is connected to signal processing circuit 17 shown in FIG. 2. The signal processing circuit 17 has central process unit 56 as a center which connect to power supply circuit 51 for pulse motor 26, power supply circuit 52 for motor 47, image-frame memory 53 to display 55, and printer 58 through interface 54.

Figure 3:
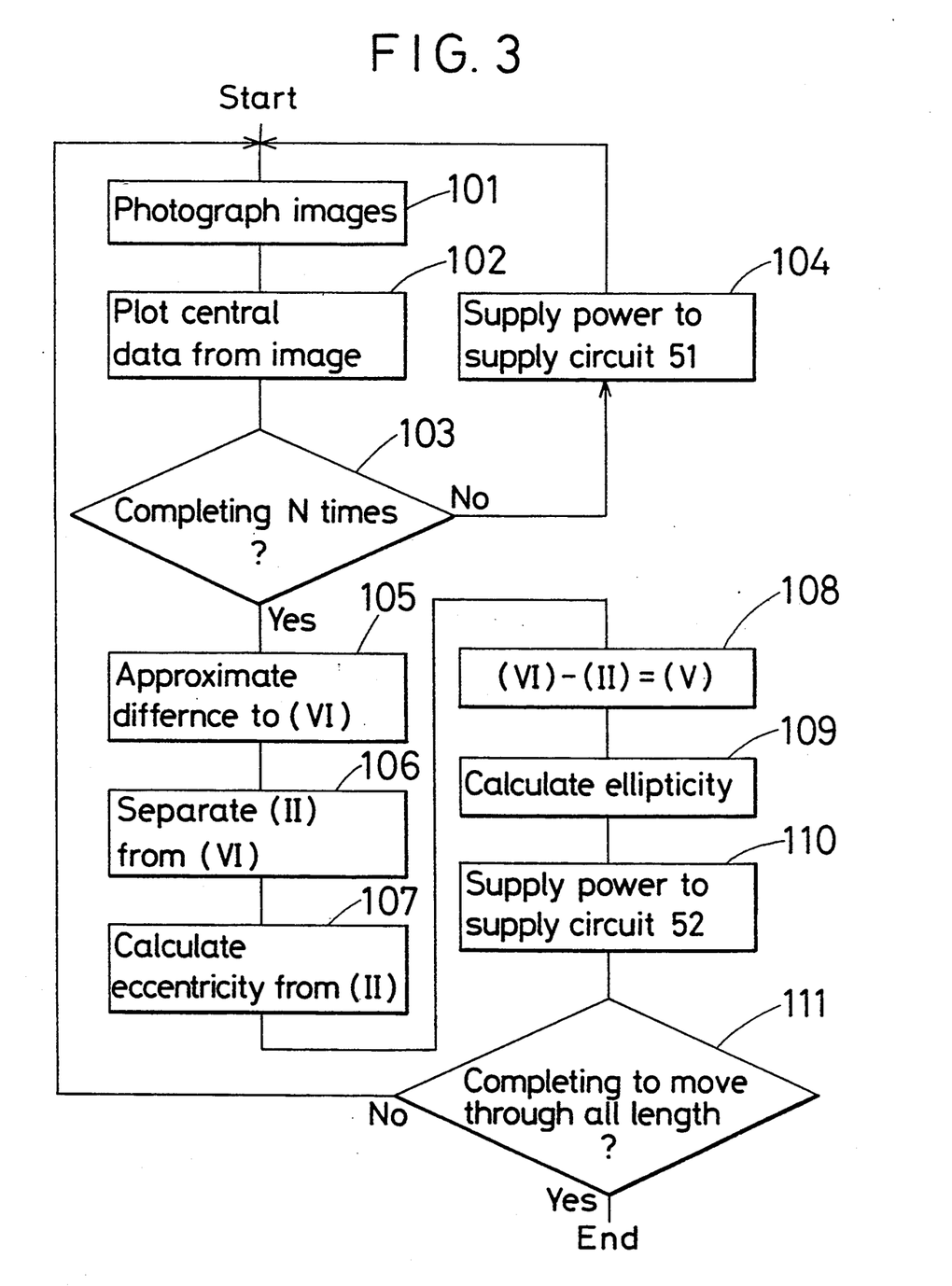
FIG. 3 is a flow chart showing an embodiment of an operation for the above apparatus.

The operation of the present apparatus for inspecting an optical fiber preform shown in FIGS. 1 and 2, is controlled operated by the central process unit 56 under a flow chart shown in FIG. 3 and then will hereinafter be explained.

Both ends of optical fiber preform 1 are nipped in chucks 21 and light source 10 is turned on and then video camera 11 takes the first photograph of the images of core 2 and optical fiber preform 1 (Step 101). Differences between central coordinate of the core 2 and central coordinate of the rotating preform 1 is calculated from the photographed images by CPU 56 and plotted into memory 53 (Step 102). Steps 1 and 2 is performed N times through one rotation, i.e. $2\pi$ radian, of the preform 1 while supplying power from power supply circuit 51 for motor 26 to rotate by $2\pi/N$ radian (Step 104). If completing N times of Steps 1 and 2 (Step 103), data of all difference of one rotation is prepared in memory 53.

A continuous line is given by approximate operation from data of the differences between central coordinates of the rotating core 2 and central coordinates of the rotating preform 1 in memory 53 by CPU 56 (Step 105). The continuous line is represented formula (VI), which is a composite curve of a sine curve having a period of $\pi$ cycle and a sine curve having a period of $2\pi$ cycle. The sine curve having the period of the $2\pi$ cycle represented by formula (II) is separated from the formula (VI) by CPU 56 (Step 106). The degree of the eccentricity of the core 2 is calculated from the amplitude of the formula (II) and stored in memory 53 (step 107). The sine curve having the period of $\pi$ cycle represented by formula (V) is provided by subtracting the formula (II) from the formula (VI) by CPU 56 (Step 108). The degree of the ellipticity of the preform 1 is calculated from the amplitude of the formula (V) and stored in memory 53 (step 109).

Further, a power is supplied from power supply circuit 52 to motor 47 to move scanning table 30 by a constant length and thus a point of photographing by video camera 11 is changed along the longitudinal direction of preform 1 (Step 110). By the each moving, the operations of the Steps 101 to 109 are repeated. If completing to move scanning table 30 through all area of length to be inspected along the preform 1 (Step 111), all data of degrees of the eccentricity of the core 2 and degrees of the ellipticity of the preform 1 is completly stored in memory 53.

Data of the differences between central coordinates of the rotating core 2 and central coordinates of the rotating preform 1, degrees of eccentricity of the core 2 and degrees of the ellipticity of the preform 1 is read out from memory 53 and supplied to display 55 for viewing and/or printer 58 for hard copies.

Optical fiber preform 1 whose clad layer has a refractive index n of 1.458, a design external shape 2D of 50 mm, a design external shape 2d for the core of 4 mm and the total length of 1,000 mm was inspected by the inspection apparatus according to the foregoing embodiment.

In the practical measurement, the optical fiber preform 1 was rotated by a step of an angle of 22.5° by the action of the rotating-driving device 14 and then the rotation thereof was interrupted to take a photograph by the video camera 11. A series of these operations was repeated 17 times to cover over 360°, i.e. $2\pi$ radian. The image signals thus obtained were inputted coordinate CPU 56 and the data of the lines showing the external shapes of the optical fiber preform 1 and the core thereof outputted from the CPU 56 were observed by display device 55 while printing out these data by the printer 58.

Figure 8:
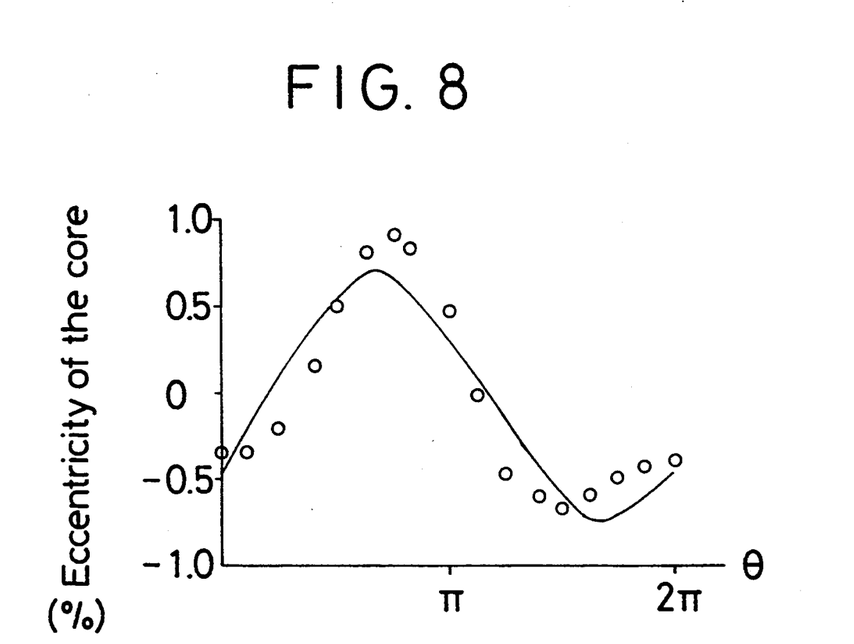
FIG. 8 is a diagram illustrating data of differences between measured central coordinates of core and central co ordinates of optical fiber preform.

Data of differences between central coordinate of the core 2 and central coordinate of the optical fiber preform 1, which was obtained the above described practical measurement and was represented by % unit to the design external shape 2D of the preform 1, is plotted by symbol in FIG. 8. A continuous line, was given by approximate operation from the data of the differences by CPU 56, is drawn also in FIG. 8.

A sine curve having the period of the $2\pi$ cycle, which was separated from the drawn continuous line, made $1.458 \times 0.65 \sin\theta$. A degree of an eccentricity was calculated from the amplitude of the sine curve. The calculated eccentricity of the core 2 was 0.65%, which was corresponding to data obtained by another practical measurement to the same sample.

Figure 9:
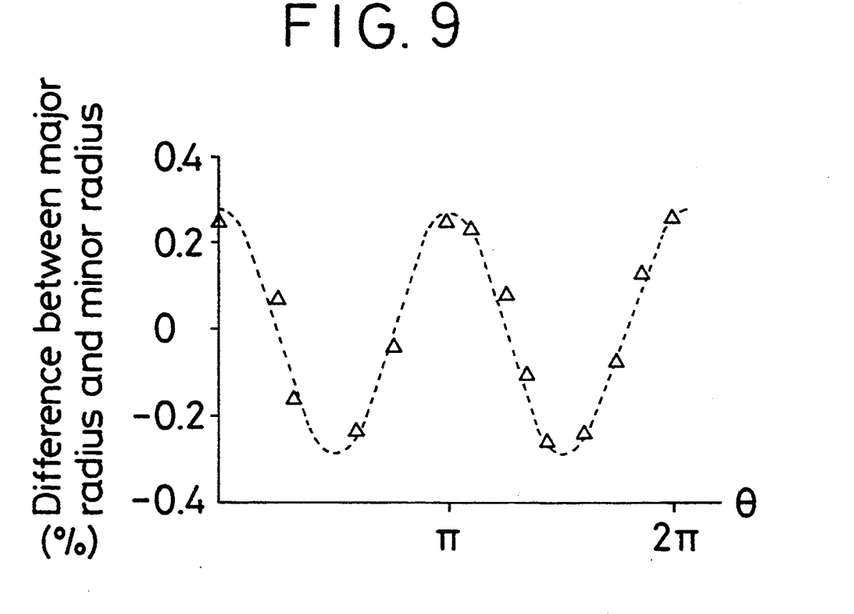
FIG. 9 is a diagram illustrating calculated data of ellipticity of the optical fiber preform.

Further, data subtracted the $1.458 \times 0.65 \sin\theta$ from the plotted symbol was plotted by symbol $\Delta$ in FIG. 9. A sine curve given by approximate operation from the subtracted data $\Delta$ is drawn also in FIG. 9. The sine curve made $(1.458-1) \times 0.3 \times \sin 2\theta$ so that the degree of the ellipticity of the preform 1 is calculated as 0.3% from the amplitude thereof. The calculated degree of the ellipticity of the preform 1 was corresponding to data obtained by another practical measurement to the same sample.

Figure 10:
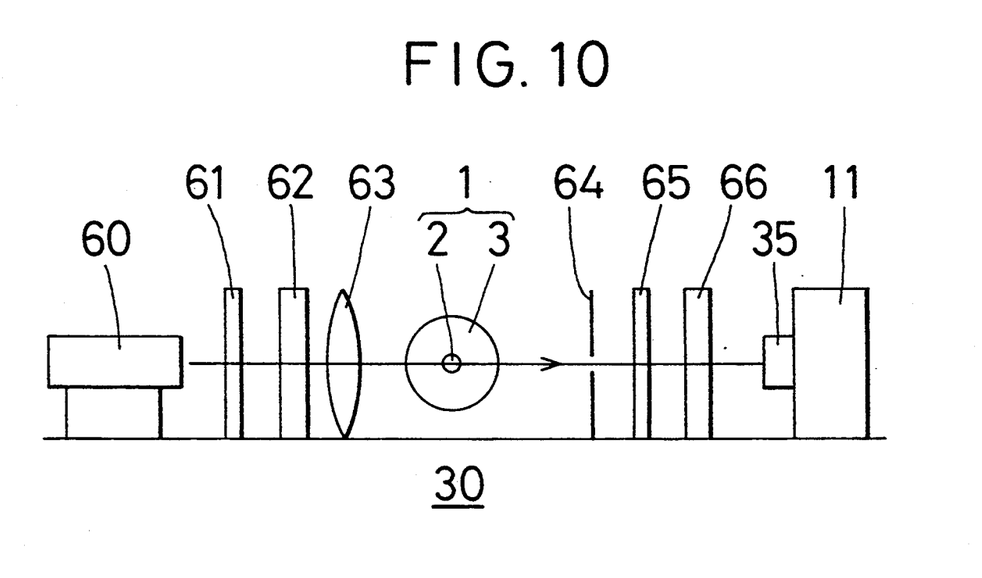
FIG. 10 is a side view showing a main part of another embodiment of the inspection apparatus according to the present invention.

FIG. 10 is a side view showing another embodiment of the optical system used in the inspection apparatus according to the present invention. This optical system is mounted on the scanning table 30 of the inspection apparatus shown in FIG. 1 and there are arranged, with a subject, i.e., the optical fiber preform 1 supported by the fixing table 20 as a center, half wave plate 61, polarizer 62 and lense 63 on the side of a light source, i.e. laser 60; and slit 64, one wave plate 65 and analyzer 66 on the side of the video camera 11. The core 2 and the clad layer 3 differ, from one another, in the amounts of dopants added thereto. Therefore, they have different thermal expansion coefficients and this results in the presence of residual stress at the interface between the core and the clad layer. For this reason, clear images of the core 2 and the clad layer 3 can be taken by the video camera 11 through the use of the optical system shown in FIG. 9. Thus, the degree of eccentricity of the core 2 can be accurately inspected while making use of this optical system in the inspection apparatus according to the present invention.

What is claimed is:

1. An apparatus for inspecting an approximately round, rod-like optical fiber preform, the preform including a longitudinal axis, a core and a clad layer, the apparatus comprising:

a light source for delivering a light beam along an optical path;

a video camera;

means for positioning being adapted to receive the fiber preform and to position the preform between the light source and the video camera so that the longitudinal axis is approximately perpendicular to the optical path;

a driving device for rotating the preform around the longitudinal axis; and a signal processing circuit for converting images obtained by the video camera into data representative of a continuous curve.

2. The apparatus for inspecting the optical fiber preform as set forth in claim 1 further comprising means for moving the optical path of the light beam relative to the optical fiber preform along the length of the preform.

3. The apparatus for inspecting an optical fiber preform as set forth in claim 1 further comprising:

a first polarizing plate positioned adjacent to the light source and adapted to be contacted by the light beam before contacting the preform, and a second polarizing plate positioned adjacent to the video camera and adapted to be contacted by the light beam after contacting the preform.

4. The apparatus for inspecting an optical fiber preform as set forth in claim 2 further comprising:

a first polarizing plate positioned adjacent to light source and adapted to be contacted by the light beam before contacting the preform, and a second polarizing plate positioned adjacent to the video camera and adapted to be contacted by the light beam after contacting the preform.

5. The apparatus of claim 1 wherein the continuous curve is representative of core eccentricity.

6. The apparatus of claim 1 wherein the continuous curve is representative of clad layer ellipticity.

7. A method for inspecting an approximately round, rod-like optical fiber preform, the preform including a longitudinal axis, a side face approximately parallel to the longitudinal axis, a core and a clad layer, the method comprising the steps of:

irradiating the preform with a light beam incident upon the preform from the side face;

photographing images of the core formed by the irradiating step;

rotating the preform about the longitudinal axis through a predetermined angle;

repeating the photographing and rotating steps until the preform has rotated through a total angle of $2\pi$ radians;

calculating a continuous curve by approximation from differences between central coordinates of the rotating core and central coordinates of the rotating preform obtained from the photographed images;

separating sine curves having a $2\theta$ radian cycle and a $\pi$ radian cycle from the continuous curve; and determining eccentricity of the core from amplitude of the sine curve having the $2\pi$ radian cycle.

8. The method of claim 7 further comprising the steps of:

moving the light beam relative to the length of the preform; and repeating all of the steps over the length of the preform.

9. A method for inspecting an approximately round, rod-like optical fiber preform, the preform including a longitudinal axis, a side face approximately parallel to the longitudinal axis, a core and a clad layer, the method comprising the steps of:

irradiating the preform with a light beam incident upon the preform from the side face;

photographing images of the core formed by the irradiating step;

rotating the preform about the longitudinal axis through a predetermined angle;

repeating the photographing and rotating steps until the preform has rotated through a total angle of $2\pi$ radians;

calculating a continuous curve by approximation from differences between central coordinates of the rotating core and central coordinates of the rotating preform obtained from the photographed images;

separating sine curves having a $2\pi$ radian cycle and a $\pi$ radian cycle from the continuous curve; and determining a difference between a major radius and a minor radius of the clad layer from amplitudes of the sine curve of the $\pi$ radian cycle.

10. The method of claim 9 further comprising the steps of:

moving the light beam relative to the length of the preform; and repeating all of the steps over the length of the preform.

* * * * *